United States Patent [19]

Day

[11] 4,032,092
[45] June 28, 1977

[54] RAMP WITH INTEGRAL TOES

[75] Inventor: John H. Day, Pacific Palisades, Calif.

[73] Assignee: McDonnell Douglas Corporation, Long Beach, Calif.

[22] Filed: Dec. 22, 1975

[21] Appl. No.: 643,506

[52] U.S. Cl. .......................... 244/137 R; 14/71.5; 244/129.5
[51] Int. Cl.² ........................................ B64C 1/14
[58] Field of Search ........ 244/137 R, 129 D, 129.5; 14/71 R, 71 M, 72 W, 71.1, 71.5, 72.5; 49/37, 40, 79; 105/367, 368 R, 378

[56] References Cited

UNITED STATES PATENTS

| 3,128,068 | 4/1964 | Pauli | 244/137 R X |
| 3,147,942 | 9/1964 | Griffith | 244/137 R |

*Primary Examiner*—Trygve M. Blix
*Assistant Examiner*—Barry L. Kelmachter
*Attorney, Agent, or Firm*—G. W. Finch; W. J. Jason; D. L. Royer

[57] ABSTRACT

A loading ramp for cargo aircraft having integral toe plates hinged thereto and automatically moved by the movement of the ramp to stowed and operative positions without the use of independent power. In addition, suitable mechanical devices therefor are provided to decouple the toes from the ramp during flight.

9 Claims, 8 Drawing Figures

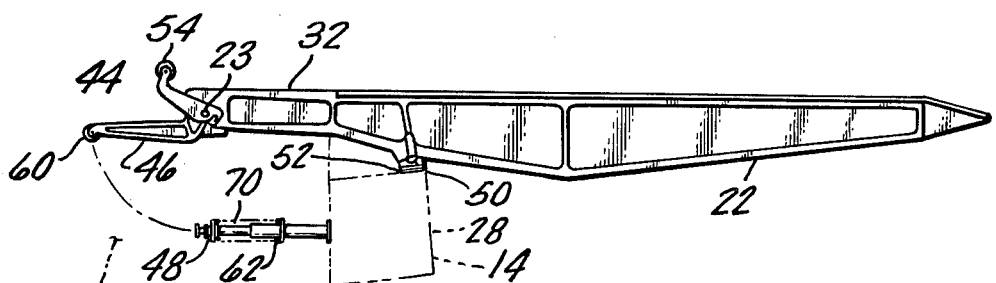
FIG_5
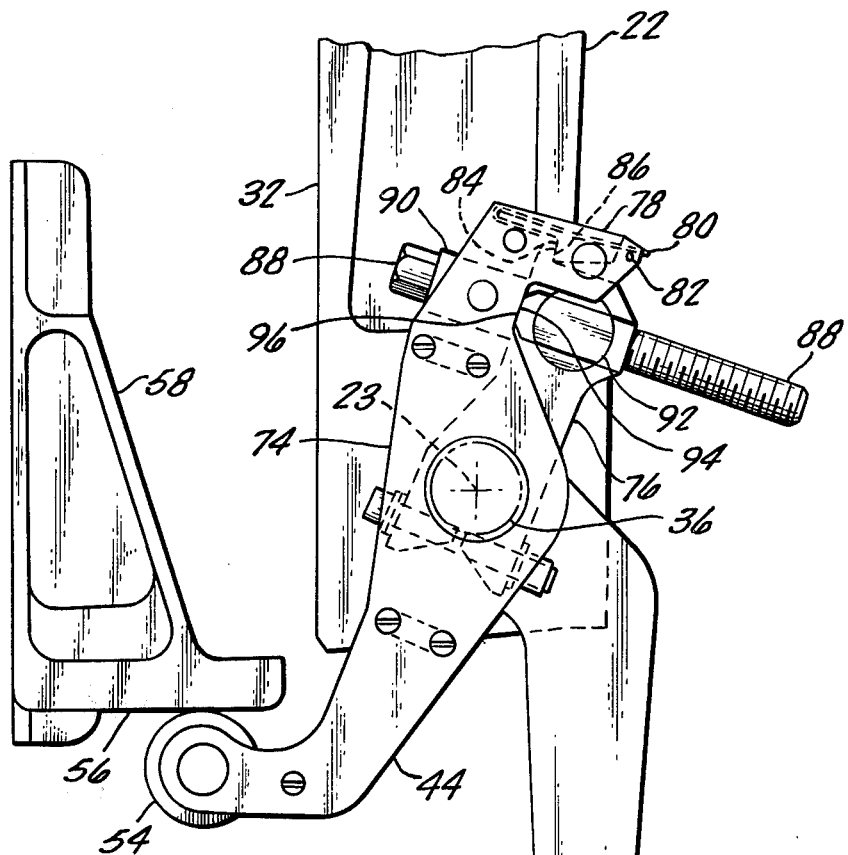
FIG_6
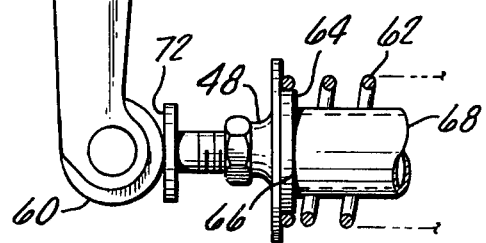

RAMP WITH INTEGRAL TOES

The Government of the United States has rights in this invention pursuant to Contract No. F33657-72-C-0833 awarded by the Department of the Air Force.

BACKGROUND OF THE INVENTION

Modern cargo aircraft usually include integral loading ramps. The ramp usually forms a portion of the aircraft fuselage. Therefore, the end of the ramp is so thick that it is not feasible to drive vehicles on or off the ramp from the ground without the use of one or more auxiliary devices called ramp toes. The ramp toes are used to form a bridge between the edge of the ramp and the ground. Toes may be integral with the ramp or they may be loose items that are attached to the ramp only when needed. The known integral toes are hinged to the end of the ramp to fold under the ramp in the stowed position and are powered independently. This independent power source for the ramp toe is relatively expensive because the toe must be operated and phased with the operation of the ramp so that it does not become jammed. Also, the use of an independent ramp toe power source increases the chances that a portion of the power ramp system will be inoperative at any given time to prevent the effective utilization of the aircraft. Since the power device for the toes is usually hydraulic, and it is always possible that hydraulic pressure will not be available, latches or other means have been required between the ramp and the toe to assure that the toe is secured during flight.

It is desirable to use the ramp for the four main types of ramp loading/off-loading, that is, straight-in loading of cargo loaders, loading from various height truck beds, straight-in loading using fork lifts and drive-on or walk-off loading with the ramp fully down. Therefore, control means must be provided with the dependently powered ramp toes to assure they remain in the desired position with respect to the ramp so that the desired loading configuration can be achieved.

BRIEF DESCRIPTION OF THE PRESENT INVENTION

The present cargo aircraft loading ramp includes one or more integral ramp toes, the position of the toes being determined by the position of the loading ramp. As the ramp is closed, the toe is moved to its stowed position with the plane of the toe approximately 90° from the plane of the ramp. The toe is held in this position by an actuating crank connected thereto which contacts a fixed striker on the aircraft when the ramp is being closed. The toe is restrained in the other direction by a stop arm on the toe and a stop fitting on the ramp. Both the fixed striker and the stop fitting may be adjustable so that the actuating crank, the stop arm, and a torque tube which connects them to the toe, can minimize toe movement in the closed position. As the ramp is opened or lowered, the distance between the fixed striker and the hinge line of the actuating crank increases permitting the actuating crank to rotate. A deployment spring is operatively connected to the stop arm to force rotation of the toe in the desired opening direction, thereby maintaining contact between the actuating crank roller and fixed striker until the toe rotates to a position where the force of gravity assures further proper rotation. After the toe is fully deployed with its bearing pads in contact with the ramp, further opening of the ramp carries the actuating crank away from the striker.

During ramp closing when it is desired to raise the toe, the toe actuating sequence is reversed. The toe is maintained in the plane of the ramp by the movable bearing pads therebetween until the actuating crank contacts the fixed striker. Subsequent closing of the ramp rotates the crank and toe toward the stowed position. As the ramp is closed and latched, the toe stop arm contacts the stop fitting which normally includes the deployment spring and the toe is securely held in the stowed position. Also, means may be employed to enable rotation of the toe with respect to the torque tube which enables simple removal of the toe when the ramp is in its closed position by lowering the toe onto adjacent aircraft structure. A simple bolted connection at the hinge fittings is disconnected to allow the removal of the toe.

When the ramp is deployed in position for straight-in loading, the toes serve to extend the effective length of the ramp, thus increasing clearance between the normally tapering aft fuselage of the aircraft and the cab of the loader vehicle. For the ramp fully down position, the abutment pads are shifted such that the aft edges of the toes can droop and contact the ground as required for vehicle drive-on or off or speed-off loading while the aircraft is taxiing.

Therefore, the present invention solves many of the problems with the previous integrated toes by providing toes that are automatically and mechanically positioned by the position of the loading ramp. Since the actuating crank and stop arm constitute the means of restraining the toe in the stowed position there is no need for separate latches and, of course, since the power of the actuating mechanism for the toes is derived from the motion of the ramp, no independent power source is required. In the preferred embodiment, the invention enables easy disconnection of the torque joint between the toe and the torque tube for maintenance and removal. Also, the toe angle with respect to the ramp at any position of the ramp can be adjusted for awkward situations not otherwise provided for.

It is, therefore, a principal object of the present invention to provide an integral ramp toe which requires no independent power source.

Another object is to provide simplified means for bridging the space between the end of a cargo ramp of a cargo aircraft and the ground or a loading dock.

Another object is to provide a ramp toe whose position with respect to the ramp of a cargo aircraft can be adjusted.

Another object is to provide integral ramp toes which can be removed during flight of the aircraft without opening the ramp.

Another object is to provide a removable integral ramp toe which can be lowered during flight onto adjacent structure so that its removal does not require strenuous manual manipulation.

Another object is to increase the utility of cargo aircraft.

Another object is to provide an integral ramp toe which can operate relatively maintenance-free in a commerical cargo or combat cargo atmosphere.

These and other objects and advantages of the present invention will become apparent to those skilled in the art after considering the following detailed specification which discloses a preferred embodiment thereof

BRIEF DESCRIPTION OF THE DRAWINGS

FIG. 5 is a side view of the toe shown in FIG. 4.

FIG. 6 is a greatly enlarged side view of the connection mechanism actuation arm and stop of the toe of FIG. 5.

DESCRIPTION OF THE SHOWN EMBODIMENT

Figure 1:
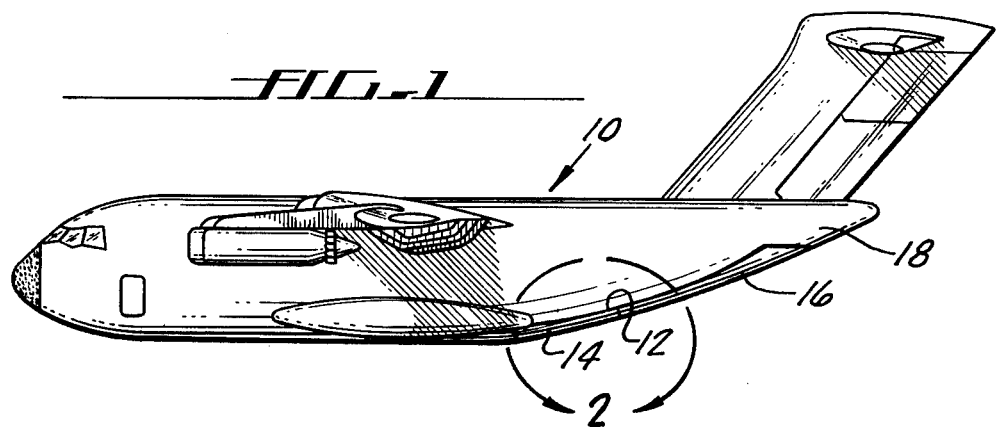
FIG. 1 is a side view of a typical cargo aircraft having a deployable ramp for loading and unloading thereof.
Figure 2:
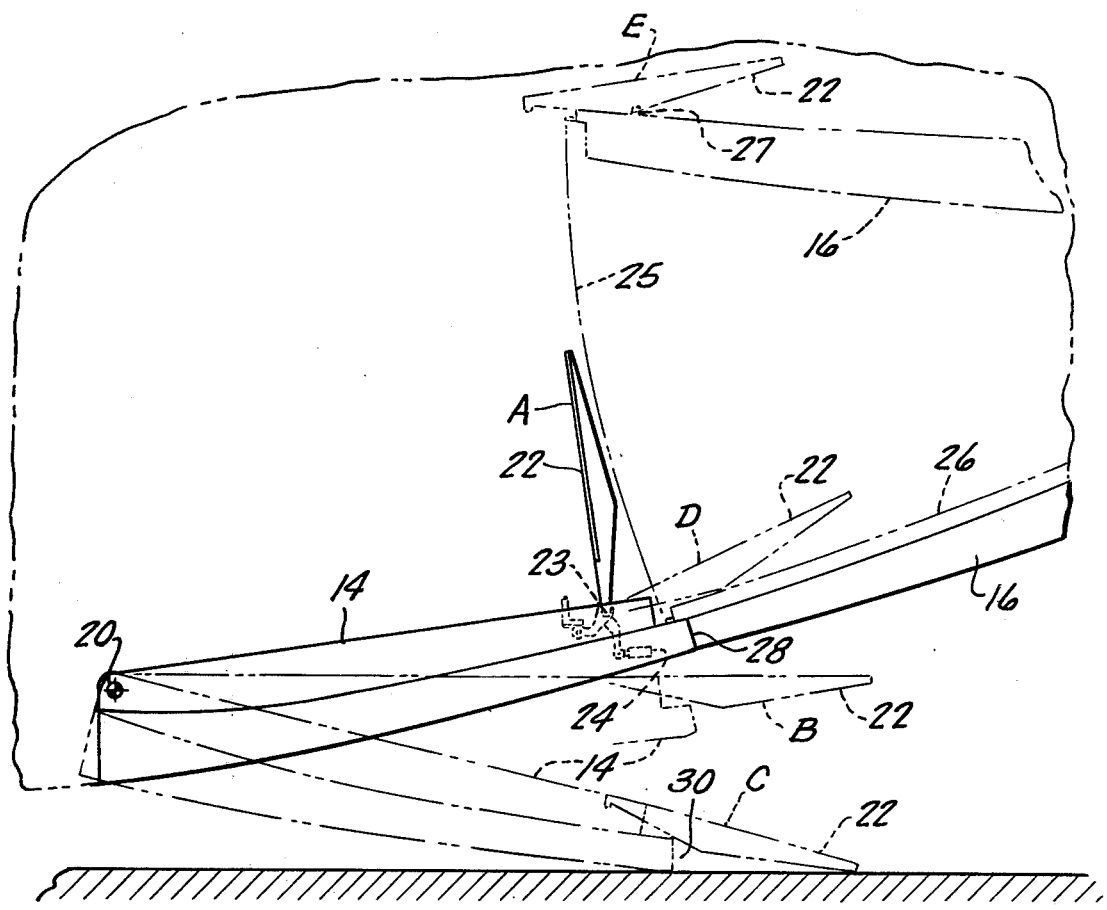
FIG. 2 is a diagrammatic view taken of the encircled area labeled 2 of FIG. 1 showing the cargo lamp with its integral lamp toes in five different possible positions.

Referring to the drawings more particularly by reference numbers, number 10 in FIG. 1 refers to a cargo aircraft having a cargo doorway 12 which is sealed by a ramp 14 and a door 16. The door 16 is pivotally mounted to the aircraft 10 by hinges along hinge line 18 so that it can be swung upwardly into the aircraft, thus clearing a portion of the doorway 12. As shown in FIG. 2, the ramp 14 is pivoted to the aircraft 10 at hinge line 20 so that it can rotate downwardly with respect to the aircraft 10 as shown.

FIG. 2 diagrammatically shows five possible positions of a ramp toe 22 which is hingedly connected at hinge line 23 to the ramp 14 near its rearward edge 24. Position A is the normal position of the toe 22 when both the ramp 14 and the door 16 are closed. When the door 16 is lifted and the ramp 14 is lowered, the toe 22 automatically lowers to position B. If the ramp continues to lower until it touches the ground, the toe 22 moves to position C. When the ramp 40 closes from the C position, the toe 22 goes through the B position to the A position, providing clearance as shown by the arc 25 for the door 16 to lower and seal against the ramp 14. There are occasions when it is desired to remove the toe 22 from the end of the ramp 14. In such cases, means to be shown are provided which decouple the toe 22 from the ramp 14 allowing it to be rotated downwardly onto the upper surface 26 of the door 16. This is shown in position D. Once the toe 22 has been disconnected from the ramp and the normal doorway opening sequence has commenced, the toe 22 remains on top on the upper surface 26 of the door 16 and moves to position E as shown. Suitable means such as the clip 27 can be provided on the upper surface 26 of the door 16 to secure the toe 22 when it is in the D and E positions or moving therebetween.

Figure 3:
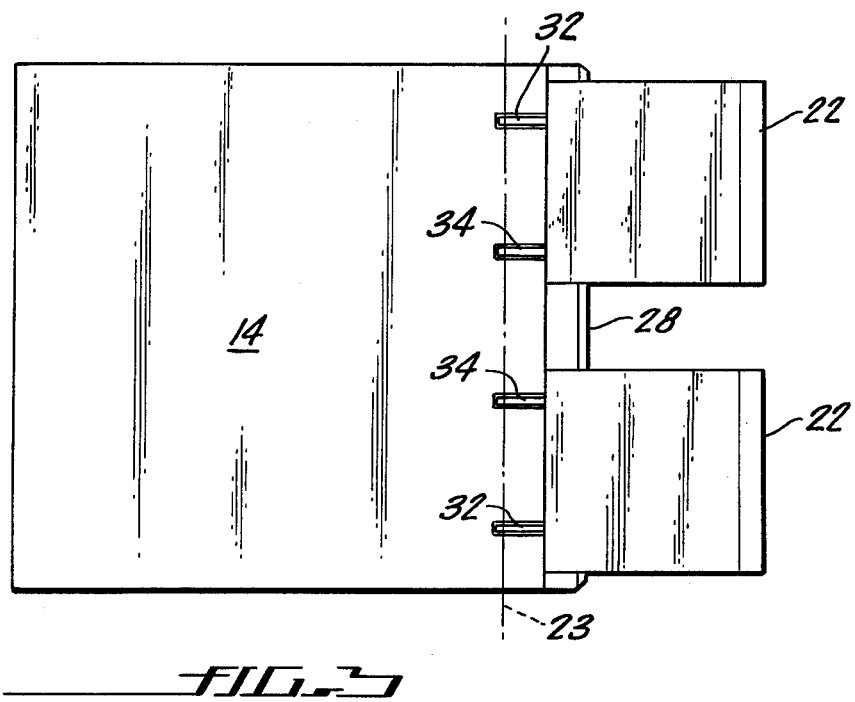
FIG. 3 is a top view of the ramp with its toes extended.
Figure 4:
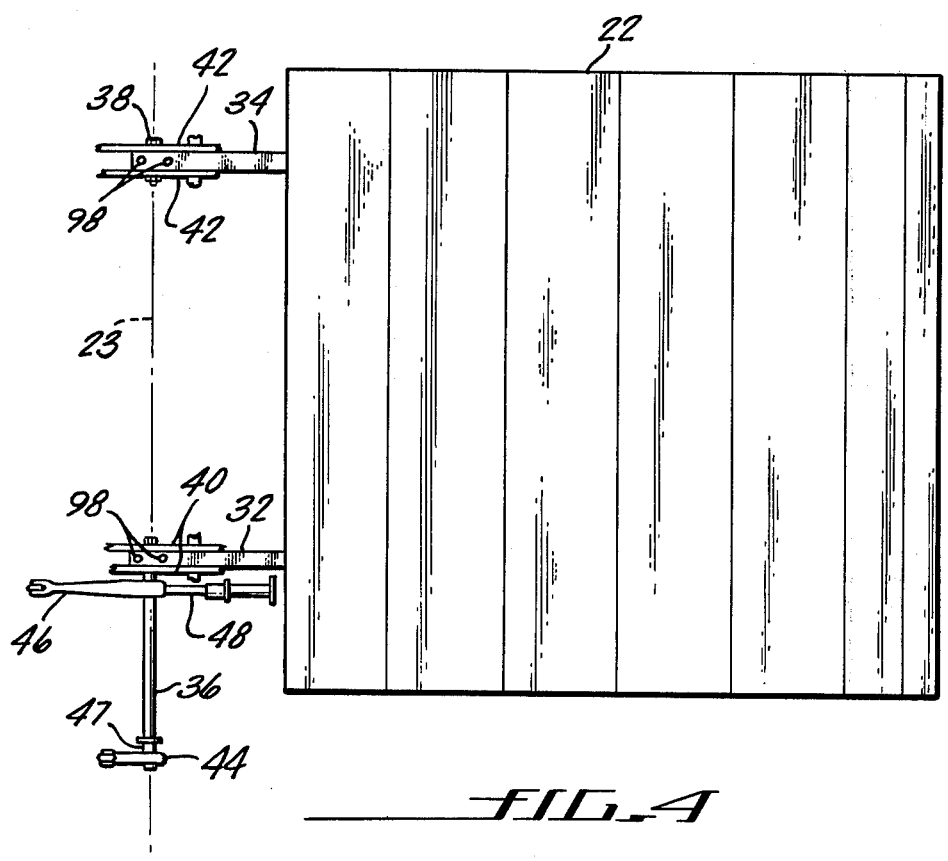
FIG. 4 is an enlarged top plan view of the left side toe of FIG. 3.

As shown in FIG. 3, the ramp 14 usually includes two toes 22 which are used to bridge the gap 30 (FIG. 2) which naturally results from the relatively thick end portion 28 of the ramp 14 which portion is required for structural reasons. The toes 22 are connected for rotation to the ramp 14 by means of hinge extensions 32 and 34. As shown in FIG. 4, the hinge is formed along the hinge line 23 by a suitable torque rod 36 and axle 38, each of which extend through bearings in the portions 40 and 42 of the ramp 14 and the extension 32 and 34. The torque rod 36 extends outwardly along the hinge line 23 and includes an actuating crank 44 connected at a right angle on the end 47 thereof. Also included on the torque rod 36 is a stop arm 46 positioned for engagement with a stop fitting 48 when the torque rod 36 and the toe 22 rotate upwardly from the down position shown in FIG. 5. When the toe 22 is in its down position, a pad 50 engages an abutment surface 52 on the ramp 14 to establish the down position angle between the toe 22 and the ramp 14. The pad 50 may be adjustable to enable adjustment of this angle.

As the ramp 14 is raised upwardly into the aircraft 10, the roller end 54 of the actuating crank 44 strikes the downward facing abutment surface 56 of a fixed striker 58 which is connected to aircraft structure. Thereafter, of course, the roller end 54 cannot rise and the continuing upward motion of the ramp 14 lifts the hinge line 23 and, with the orientation of FIG. 6, causes counterclockwise rotation of the actuation crank 44, the torque rod 36 and the toe 22. As the ramp 14 approaches position A in FIG. 2, the stop arm 46 engages the stop fitting 48 with its roller end 60. A spring 62 is associated with stop fitting 48 and is compressed by this motion until two facing abutment surfaces 64 and 66 incorporated into the stop fitting 48 engage. Abutment surface 66 can be the end of a cylinder 68 in which a rod 70 (FIG. 5) slides to allow compression of the spring 62 while maintaining the linear alignment of the stop fitting 48 while the abutment surface 64 can be a portion of the restrainer surface for the spring 62. The spring 62 forces the toe 22 to rotate as the ramp 14 is lowered so the roller end 54 of the actuating crank 44 does not disengage the striker member 58 until the toe pad 50 engages the camp 14. Otherwise, undesirable impact between the toe pad 50 and the ramp 14 or the actuating crank 44 and the striker member 58 may occur. For adjustment purposes the portion 72 of the fitting 48 which contacts the roller end 60 may be threadably connected to the rest of the stop fitting as shown. This enables the linear adjustment and rigging of the toe 22.

Figure 7:
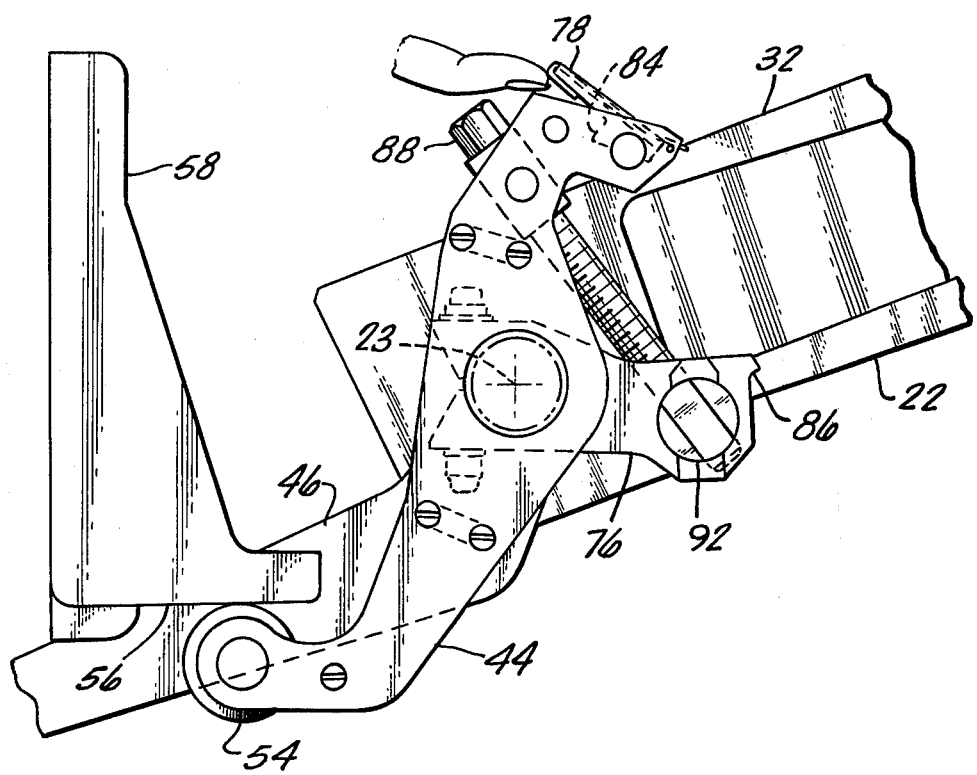
FIG. 7 is a view similar to FIG. 6 showing the operation of the means to adjust the angle of the toe with respect to the actuation arm and stop for removal or adjustment thereof.
Figure 8:
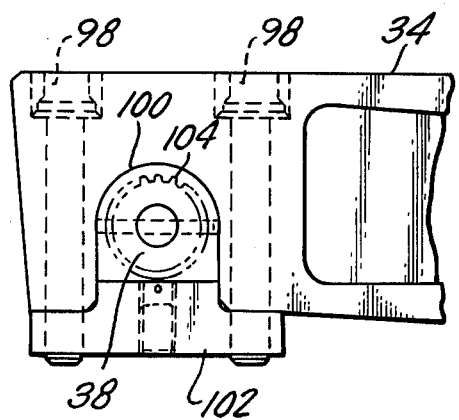
FIG. 8 is a detailed view of the hinge portion of the toe showing the connection between the torque tube and the toe.

The stop arm 46 is fixedly connected to the torque rod 36 so that it cannot rotate with respect thereto. However, a portion 74 of the actuating crank 44 is connected to rotate with respect to the torque rod 36. This rotation normally is restrained by a second crank portion 76 which is held to the portion 74 by means of a catch 78 spring-loaded downwardly by a spring 80. The catch 78 is connected to the portion 74 by a pivot 82 which, along with the spring 80, allows upward rotation when manual force is applied thereto. The catch 78 includes an abutment surface 84 which engages a similar abutment surface 86 on the second crank portion 76 to normally retain the two together. When it is desired to lower the toe 22 without lowering the ramp 14, the catch 78 is manually disengaged and a bolt 88 which is connected between the two portions 74 and 76 by suitable means such as a pivoted collar 90 which pivotally connects the bolt to portion 74 and a threaded transverse cylinder 92 which provides a pivotal connection to the portion 76. In addition, a second stop can be provided consisting of abutting surfaces 94 and 96 formed on the portions 74 and 76, respectively, so that the bolt 88 jams as the two portions are positioned as in FIG. 6. The result of the above-described motion can be seen in FIG. 7 wherein the catch 78 has been disengaged and the bolt 88 has been turned, allowing relative rotation of the two portions 74 and 76 of the actuating crank 44, thus lowering the toe 22. It should be noted that the stop arm 46 rotates with the toe 22 and is assisted in this rotation by the spring 62.

Once the toe 22 has been lowered, either to accommodate an awkward situation or to the position D shown in FIG. 2, the toe 22 can be released from the torque rod 36 by removing bolts 98 which restrain the torque rod in a U-shaped portion 100 of the extension 32 by means of a retainer 102. Similar means are used to release the axle 38 at the other hinge extension 34. Thereafter, the toe 22 can be raised with the door 16 to position E.

When it is desired to reconnect the toe 22 to the ramp 14, the opposite procedure is followed by connecting the toe 22 to the torque rod 36 and the axle 38 and then using the bolt 88 to rotate the toe 22 back to the position shown in FIG. 6. It should be noted that the connection between the torque rod 36 and the toe 22 can employ positive torque transmitting means such as the serrations 104 shown. Similar serrations can be used for the connection between the torque rod 36 and the second portion 76 of the actuating crank 44 and the stop arm 46.

Thus, there has been shown and described a novel ramp with integral toes which fulfills all the objects and advantages sought therefor. Many changes, alterations, modifications and other uses and applications of the subject ramp with integral toes will become apparent to those skilled in the art after considering this specification and the accompanying drawings. All such changes, alterations, modifications, uses and applications which do not depart from the spirit and scope of the invention are deemed to be covered by the invention which is limited only by the claims which follow.

What is claimed is:

1. In an aircraft including a movable loading ramp with at least one ramp toe having a hinged connection for rotation with respect to said ramp, the improvement comprising:
   first abutment means connected to said aircraft;
   second abutment means connected to said ramp;
   third abutment means connected to said toe positioned to engage said second abutment means and to restrict rotation in a first direction of said toe with respect to said ramp when said toe is in a first predetermined position with respect to said ramp; and
   an actuating crank operatively connected to said toe having an end out of alignment with said hinged connection, said end being positioned to engage said first abutment means as said ramp is moved from an open position to a closed position and to disengage said first abutment means as said ramp is moved from a closed position to an open position, whereby said actuating crank rotates said toe when said end is in contact with said first abutment means and said ramp is moving.

2. The improvement defined in claim 1 including:
   fourth abutment means connected to said ramp; and
   a stop arm operatively connected to said toe having an end out of alignment with said hinged connection positioned to engage said fourth abutment means as said ramp is moved to its closed position.

3. The improvement defined in claim 2 wherein said fourth abutment means is resilient.

4. The improvement defined in claim 1 including:
   a torque rod operatively connecting said actuating crank to said toe.

5. The improvement defined in claim 4 including:
   fourth abutment means rsiliently connected to said ramp; and
   a stop arm connected to said torque rod having and end out of alignment with said hinged connection positioned to engage said fourth abutment means as said ramp is moved to its closed position.

6. The improvement defined in claim 4 wherein said actuating crank includes:
   a first crank portion having said end positioned to engage said first abutment means and a pivot connection to said torque rod which allows relative rotation therebetween;
   a second crank portion connected to rotate with said torque rod; and
   means for rotating said first portion of said actuating crank in relation to said second portion thereof.

7. The improvement defined in claim 6 wherein said means for rotating said first crank portion in relation to said second crank portion includes:
   a screw,
   a block pivotally connected to one of said crank portions through which said screw passes and is restrained; and
   a nut pivotally connected to the other of said crank portions which threadably engages said screw.

8. The improvement defined in claim 6 including:
   releasable locking means which releasably retain said first and second crank portions in a predetermined relative position.

9. The improvement defined in claim 6 including:
   releasable attachment means connecting said toe to said ramp.

* * * * *